United States Patent
Zhang et al.

(12) 
(10) Patent No.: US 11,055,335 B2
(45) Date of Patent: Jul. 6, 2021

(54) CONTEXTUAL BASED IMAGE SEARCH RESULTS

(71) Applicant: Google LLC, Mountain View, CA (US)

(72) Inventors: Wencong Zhang, San Jose, CA (US); Jyoti Sood, Redwood City, CA (US); Kamal Tiwari, Fremont, CA (US); Amitabh Saikia, Mountain View, CA (US); Venkatesh Manickavasagam, Mountain View, CA (US); Yilin Xiong, Beijing (CN)

(73) Assignee: Google LLC, Mountain View, CA (US)

( * ) Notice: Subject to any disclaimer, the term of this patent is extended or adjusted under 35 U.S.C. 154(b) by 778 days.

(21) Appl. No.: 15/211,535

(22) Filed: Jul. 15, 2016

(65) Prior Publication Data

US 2018/0018390 A1    Jan. 18, 2018

(51) Int. Cl.
| | |
|---|---|
| *G06F 16/35* | (2019.01) |
| *G06F 16/33* | (2019.01) |
| *G06F 16/58* | (2019.01) |
| *G06F 16/951* | (2019.01) |
| *G06F 16/51* | (2019.01) |

(52) U.S. Cl.
CPC ......... *G06F 16/35* (2019.01); *G06F 16/334* (2019.01); *G06F 16/51* (2019.01); *G06F 16/5866* (2019.01); *G06F 16/951* (2019.01)

(58) Field of Classification Search
CPC ........ G06F 16/334; G06F 16/35; G06F 16/51; G06F 16/5866; G06F 16/951
See application file for complete search history.

(56) References Cited

U.S. PATENT DOCUMENTS

| | | | | |
|---|---|---|---|---|
| 7,657,100 | B2* | 2/2010 | Gokturk | G06K 9/46 |
| | | | | 382/209 |
| 8,542,950 | B2* | 9/2013 | Berg | G06F 16/583 |
| | | | | 382/305 |
| 8,620,929 | B2* | 12/2013 | Shon | G06F 17/30864 |
| | | | | 707/732 |
| 8,873,867 | B1 | 10/2014 | Alldrin et al. | |
| 9,158,857 | B2 | 10/2015 | Preetham et al. | |

(Continued)

OTHER PUBLICATIONS

International Search Report and Written Opinion issued in International Application No. PCT/US2017/040900, dated Oct. 18, 2017, 13 pages.

*Primary Examiner* — Ashish Thomas
*Assistant Examiner* — Mellissa M. Ohba
(74) *Attorney, Agent, or Firm* — Dority & Manning, PA

(57) ABSTRACT

Methods, systems, and apparatus, including computer programs encoded on a computer storage medium determining image relevance responsive to a search query. A method includes, for each resource in a plurality of resources, wherein each resource includes one or more images and text that is separate from each of the one or more images: determining, by a data processing apparatus, and from the text of the resource, resource topics described by the text of the resource. For each of the one or more images, processing the image to determine a set of image topics that describe topics to which content depicted in the image belongs. Determining, by the data process apparatus, one or more topic match scores, wherein each topic match score is a measure of relevance one or more of the image topics of the image to one or more of the resource topics of the resource.

22 Claims, 5 Drawing Sheets

(56) References Cited

U.S. PATENT DOCUMENTS

| | | | |
|---|---|---|---|
| 2005/0105775 A1* | 5/2005 | Luo | G06K 9/00664 |
| | | | 382/115 |
| 2006/0294068 A1 | 12/2006 | Li et al. | |
| 2010/0303342 A1* | 12/2010 | Berg | G06F 16/583 |
| | | | 382/155 |
| 2012/0124034 A1* | 5/2012 | Jing | G06F 17/30265 |
| | | | 707/722 |
| 2015/0012547 A1* | 1/2015 | Jing | G06F 17/30265 |
| | | | 707/749 |
| 2015/0169177 A1 | 6/2015 | Zhao et al. | |
| 2019/0197364 A1* | 6/2019 | Cheng | G06K 9/6284 |

* cited by examiner

CONTEXTUAL BASED IMAGE SEARCH RESULTS

BACKGROUND

This specification relates to presentation of image search results responsive to a search query.

The Internet provides access to a wide variety of resources, for example, webpages, image files, audio files, and videos. These resources include content for particular subjects, book articles, or news articles. A search system can select one or more resources in response to receiving a search query. A search query is data that a user submits to a search engine to find information to satisfy the user's informational needs. The search queries are usually in the form of text, e.g., one or more query terms, but other types of search queries can also be processed. The search system selects and scores content, such as images and resources, based on their relevance to the search query and on their importance relative to other resources, and provides search results that link to the selected content. The search results are typically ranked according to the scores and presented according to the ranking.

In the case of image searching, an image may be scored based on one or more of the relevance of tags, e.g., captions associated with the image, to the query terms, the selection rate of the image, and other factors. An images, however, may not always depict content that closely corresponds to the underlying content of the resource in which the image is displayed. For example, an image of an artist performing with an iconic landmark in the background may be displayed in a web page that includes an article reporting on the performance. The underlying web page and the article, however, may provide no information about the famous landmark in the background. Regardless, many image processing systems will recognize the landmark in the background and tag the image as being relevant to the landmark. Furthermore, if the artist is relatively famous, the image and the resource may receive a relative high amount of traffic. Accordingly, should a user that is seeking information about the famous landmark enter a query describing the famous landmark, the user may be presented with the image as one of many search results. However, the underlying resource, which reports on the artist's performance, will likely not satisfy the user's informational needs regarding the famous landmark.

SUMMARY

In general, one innovative aspect of the subject matter described in this specification can be embodied in methods that include the actions of, for each resource in a plurality of resources, wherein each resource includes one or more images and text that is separate from each of the one or more images: determining, by a data processing apparatus, and from the text of the resource, resource topics described by the text of the resource. For each of the one the one or more images, processing, by the data processing apparatus, the image to determine a set of image topics that describe topics to which content depicted in the image belongs. Determining, by the data process apparatus, one or topic match scores, wherein each topic match score is a measure of relevance one or more of the image topics of the image to one or more of the resource topics of the resource. Storing in an index, by the data processing apparatus and for the image, data that describes the image topics for the image, resource topics for the resource, and the one or more topic match scores for the image. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The present systems and methods provide image search results based on topical similarity between the image and the resource that includes the image. The topicality similarity is used as a ranking signal to rank images responsive to a search query. By considering the topicality similarity, the system provides image search results that link to images that are very likely to be topically relevant to the text of the resources on which the images are hosted. This better serves users whose informational needs are only partially satisfied by an image, and who may benefit from additional contextual information included in the resource. This results in fewer query revisions and searches, which, in turn, improves the overall system performance of a system that performs image searching operations.

In some implementations, the present systems and methods also take into account the image's characteristics (e.g., size, location, type, etc.) when determining the topic match score for each image presented in an image search result. Taking into account the image's characteristics when determining the topic match score further refines the accuracy of the relevance of the image to the search query.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Overview

Image search results are presented to a user, typically in response to a search query, in an attempt to satisfy the informational need of the user. Image search results are generated by ranking images based on a relevance of the content depicted in the image to the search query, a relevance of the content in the image to the topicality of content within the resource that the image belongs, and, optionally, the prominence of the image within the resource. The relevance of the content in the image to the topicality of content within the resource that the image belongs and the prominence of the image within the resource are measures that may be stored in an index prior to query time.

To build this index, a search system selects resources, such as web pages, that include images. For each resource, the system determines resource topics described by the text of the resource. For each image in the resource, the system determines a set of image topics that describe topics to which content depicted in the image belongs. The resource topics and the image topics are compared to each other to determine a topic match score indicative of how similar the image content topics are to the resource topics.

The system can also determine a prominence score for each image and use this prominence score to adjust the topic match scores. The prominence score describes how prominent the image is within the resource that it is presented in. For example, an image with a higher prominence score may be a larger image centrally displayed within the resource. Conversely, an image with a lower prominence score may be a thumbnail image located at the bottom or side of the resource. Each image's topic match score can be modified by incorporating the image's prominence score.

In response to an image seeking query, the system can access previously determined resource topics, image topics, and topic match scores for particular candidate images by accessing information stored the index. The system can then determine, for each of the images, a search score based on these values. The search score is a measures of relevance of the image to the image seeking query.

These features and additional features of providing image search results based on topical relevance of an image and are described in more detail below. Additionally, while the description that follows uses images as an illustrative example, the systems and methods described below may also be used for other types of content, such as videos, audio, and any other non-textual content for which the topicality of the content can be determined and evaluated against the topicality of the content of the underlying resource in which the content is presented.

Example Environment

Figure 1:
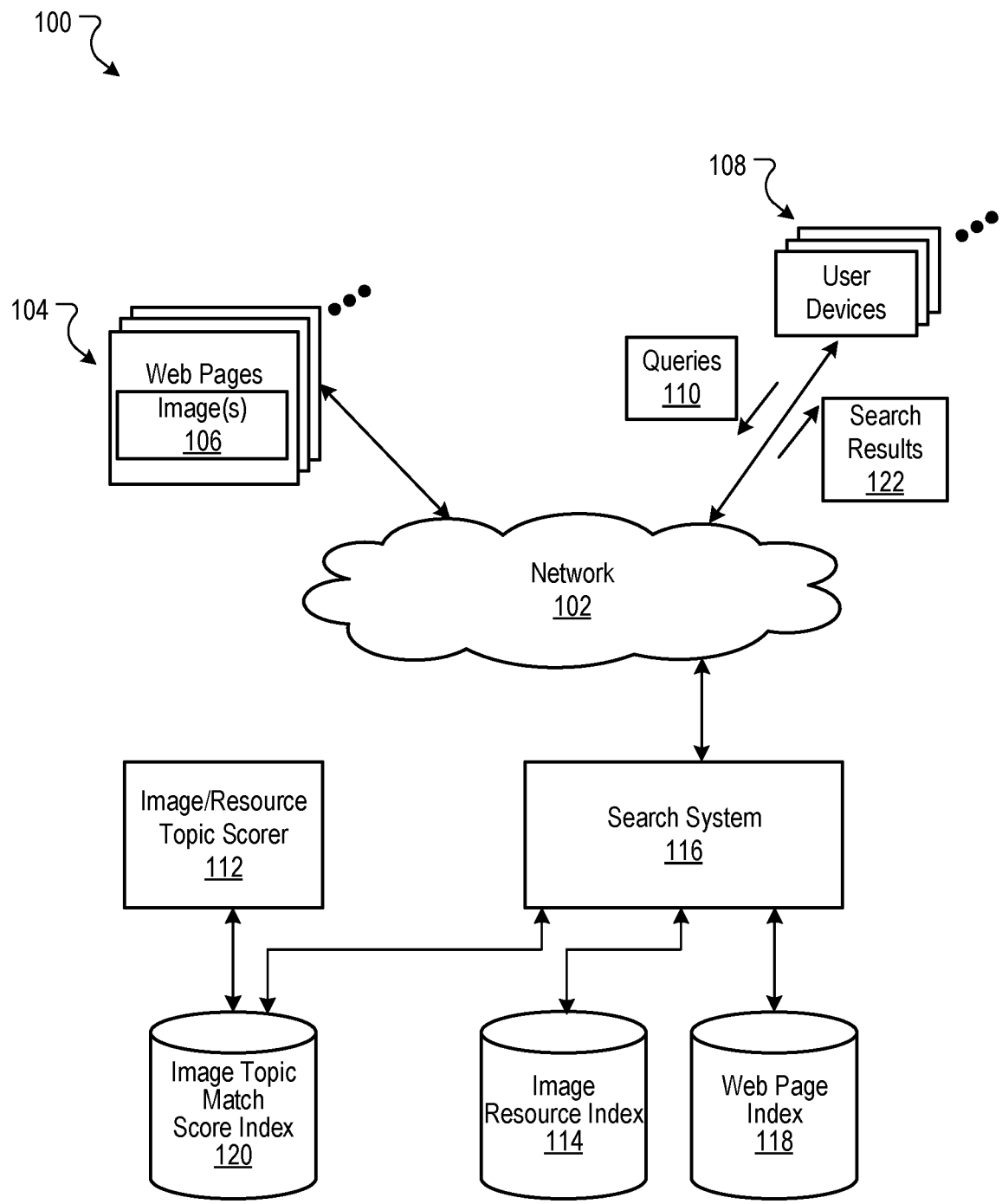
FIG. 1 is a block diagram of an example environment in which image search results are processed.

FIG. 1 is a block diagram of an example environment 100 in which image search results are processed. The example environment 100 includes a network 102 (e.g., a local area network (LAN), wide area network (WAN), the Internet, or a combination of them), that connects web pages 104, user devices 108, and the search system 116. The environment 100 may include many thousands of web pages 104 and user devices 108.

A web page 104 is one or more resources associated with a domain name, and each web page is hosted by one or more servers. An example web page is a collection of webpages formatted in hypertext markup language (HTML) that can contain text, graphic images, multimedia content, and programming elements, such as scripts. Each web page 104 is maintained by a publisher, e.g., an entity that manages and/or owns the web page.

A web page 104 can include one or more images 106 that is presented with the resource. Each web page 104 and image 106 is associated with a resource address, such as a URL. Web pages 104 include text and may also include links to other types of resources that are rendered and displayed with the text of the webpage resource. In particular, images 106 are often rendered with web pages 104. An image 106 is represented by image data that is used to render an image of a subject. While image data is typically included in web page data, they can also be hosted as separately addressable resources.

To facilitate searching of web pages 104, the search system 116 identifies the resources by crawling the publisher web pages 104 and indexing the resources provided by the publisher web pages 104. In some implementations, the indexes are stored in an image resource index 114 and a web page index 118. The indexes 114 and 118 are shown as separate indexes. However, in some implementations, the indexes can be combined in a single index, and search for a respective corpus can be constrained to the portion of the combined index that is used to index the respective corpus.

For a search of textual content, the web page index 118 is searched, and resources are ranked based on information retrieval ("IR") scores that measure the relevance of the resource to the query, and optionally an authority score of each resource relative to other resources. The ranking of the search results is based on relevance scores that are a combination (e.g., sums, products, or other mathematical combinations) of the IR scores and the authority scores. The search results 122 are ordered according to these relevance scores and provided to the user device according to the order.

For a search directed to images, the search system 116 accesses the image resource index 114. In some implementations, the search system 116 determines a search score for an image that measures the relevance of an image to an image seeking query.

Often a search will return search results for both images and resources. When this occurs, the image search results are typically provided in a group in-line with the resource search results. Additional details describing image searching will discussed in connection with FIGS. 2A-3B.

The user devices 108 receive the search results 122, e.g., in the form of a listing of the results in a webpage, and render the pages for presentation to users. The search results are data generated by the search system 116 that identifies resources that are responsive to a particular search query. Each search result includes a link to a corresponding resource, e.g., a link to a webpage for a general search result, or link to an image for an image search result. An example general search result includes a webpage title, a snippet of text, and a URL of the webpage. An example image search result includes a thumbnail of an image, a URL of the webpage in which the image is referenced, and, optionally, labeled data describing the subject of the image.

To score the images in response to a search query, the search system 116 accesses topic match scores in an image topic match score index 120. The image topic match scores define, for each image in each resource, a measure of relevance of one or more of image topics of the image to one or more of resource topics of the resource. These topic match scores are used, in part, to generate search scores for an image in response to an image seeking query.

Generation of the image topic match scores is described with reference to FIGS. 2A and 2B below. Search processing that uses the image topic match scores is described with reference to FIGS. 3A and 3B below.

Image Topic Match Score Generation

Figure 2A:
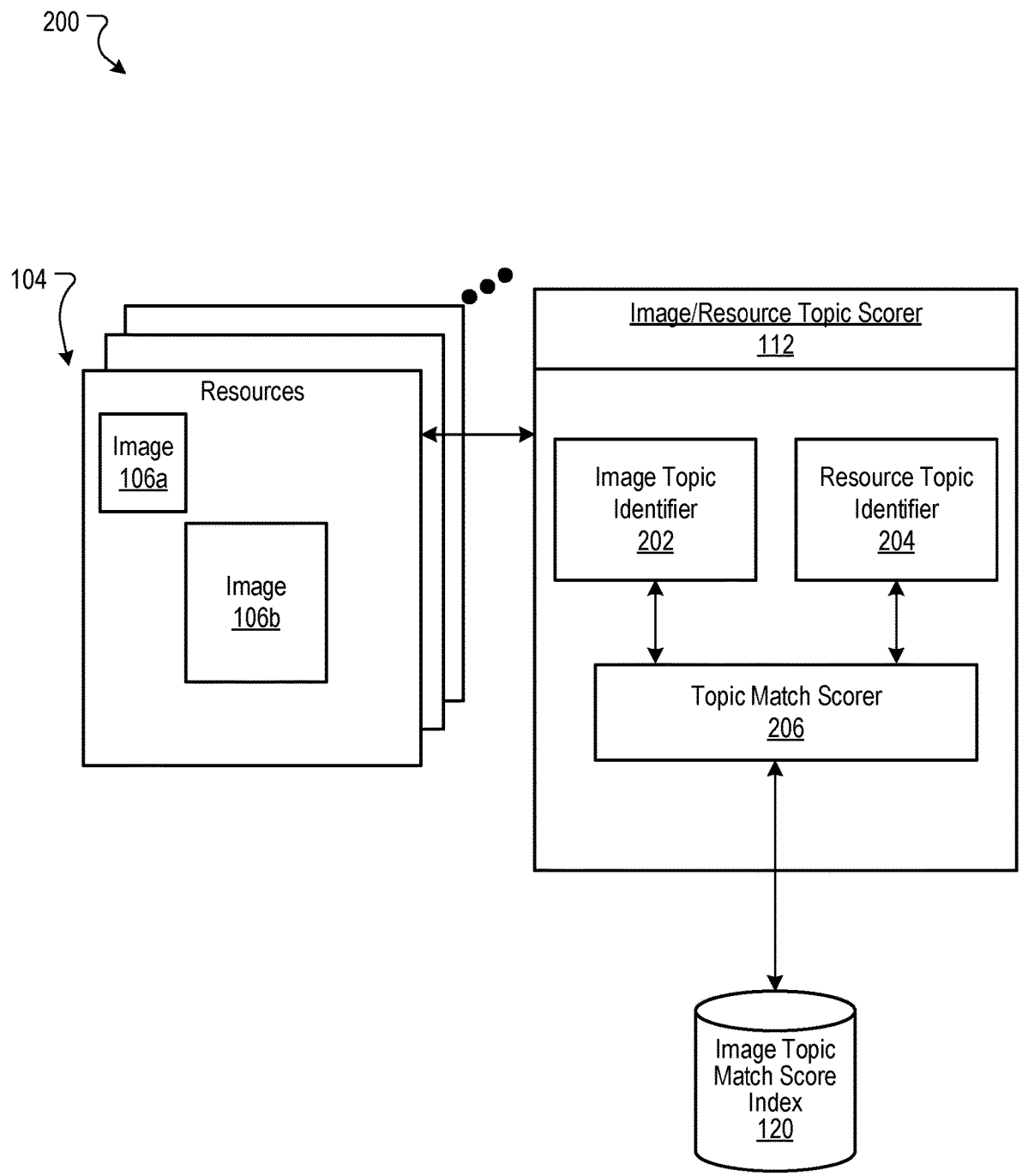
FIG. 2A is a block diagram illustrating components that score topics and topic relevance for an image.
Figure 2B:
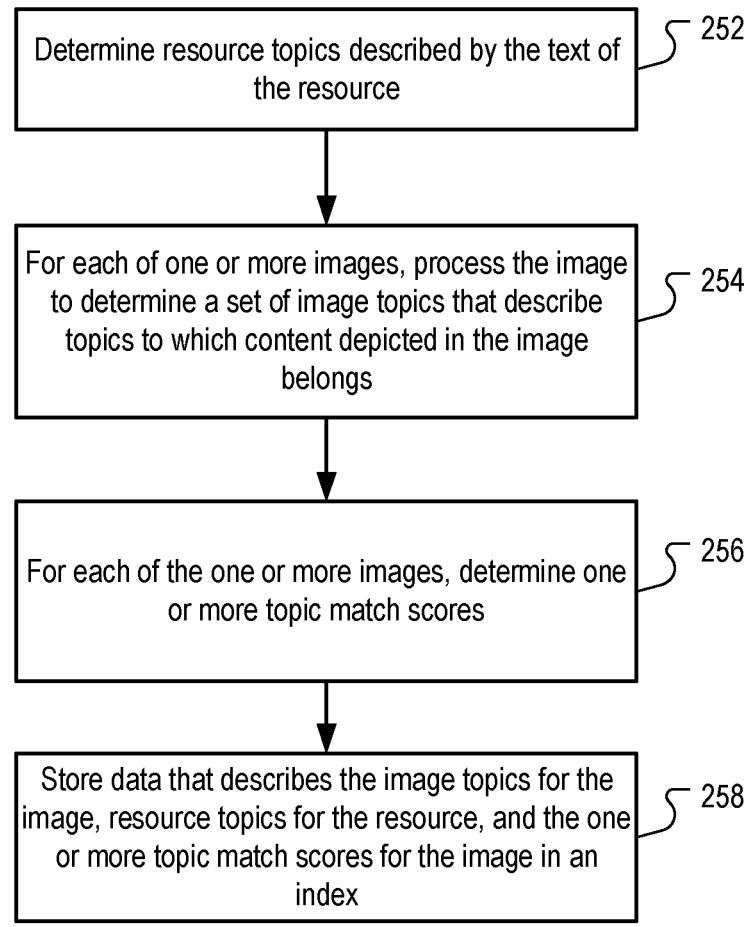
FIG. 2B is a flowchart of an example process for determining topic match scores by the system in FIG. 2A.

FIG. 2A is a block diagram illustrating components that score topics and topic relevance for an image. The components may be implemented in a data processing apparatus of one or more computers.

An image/resource topic scorer 112 processes resources 104 that each include one or more images. Each resource also includes other information, such as text, that is separate from each of the one or more images. For each resource, the scorer 112 determines a topic match score(s) for each image in the resource. In particular, the topic match score for an image is based on the relevance of topics to which content depicted in the image belongs to the resource topics described by the text of the resource. Thus, the higher the relevance of the topics of the content in the image to the topics of content of the resource, the higher the topic match score.

In the example implementation of FIG. 2A, the image/resource topic scorer 112 includes an image topic identifier 202, a resource topic identifier 204, and a topic match scorer 206, the operations of which are described with reference to FIG. 2B, which is a flowchart of an example process 250 for determining topic match scores by the system in FIG. 2A. The process 250 is performed for each resource 104 that includes one or more images.

The resource topic identifier 204 determines, from the text of the resource, resource topics described by the text of the resource (252). In some implementations, the resource topic identifier determines the topics of the using one or more of semantic analysis of the text body of the resource, analyzing anchor text in the resource and the title of the resource, and/or any other appropriate technique for determining the topic of the resource. For example, the resource topic identifier 204 may identify which terms (e.g., words, common names, etc.) occur more frequently within the resource and consider those terms as being representative of topics and/or topic tags for the content within the resource.

As illustrated in FIG. 2A, a resource 104 can have more than one image, e.g., 106a and 106b, presented within the resource 104. For each image within a resource 104, the image topic identifier 202 processes the image to determine a set of image topics that describe topics to which content depicted in the image belongs (254). In some implementations, images 106 may have topic tags that are associated with each of the images 106. The topic tags, which are generally metadata tags, are descriptive of the image's content and categories to which the image belongs. For example, an image of the Empire State Building may have the following topic tags: Empire State Building, New York, sky scraper, tall building, Manhattan, etc. These tags may be used to determine the topics for the image.

In some implementations, determining a set of image topics that describe topics to which content depicted in the image belongs can be done by submitting the image to an image annotation system and receiving for the image a set of annotations as the image topics. The image annotation system, in some implementations, determines the labels based on computer image processing of the image that determines content depicted in the image, and the labels are descriptive of the determined content. An image content annotation system, for example, may use machine learned models to classify images into categories. After analyzing an image, the image annotation systems assigns metadata tags to the image.

Other ways of determining topics to which content depicted in the image belongs can also be used.

The topic match scorer 206, for each image within a resource, determines one or more topic match scores (256). Each topic match score is a measure of relevance of one or more of the image topics of the image to one or more of the resource topics of the resource. The topic match scorer 206 uses the image and resource topics identified by the image topic identifier 202 and the resource topic identifier 204 to determine the topic match scores. For example, a first resource may describe the history, facts, and the current state of the Empire State Building, and contain an image, image A, of the Empire State Building. A second resource may also include an image depicting the Empire State Building (image B), but the second resource may describe photo editing techniques, and the image of the Empire State building is used to illustrate the end result of such techniques. For image A, the topic match scores will much higher than image B. As an example, the topic match scorer 206 may assign image A nominalized topic match score of 0.99 and image B a nominalized topic match score of 0.10.

In some implementations, a single topic match score may be generated for each image. For example, assume four topics are determined for the image—IT1, IT2, IT3, and IT4, and three topics are determined for the resource—RT1, RT2, and RT3. A topic match score for the image I may be generated by a generalized function:

$$TM(I)=f(IT1,IT2,IT3,IT4,RT1,RT2,RT3).$$

Any appropriate scoring function can be used. For example, binary scoring may be used for matched topics between the image the resource, and the topic match score may be a summation of the positive binary matches. Alternatively, scoring based on topic similarity can be used, e.g., the topics of "baseball" for an image and "baseball" for a resource may result in a very high similarity score, while the topics of "baseball" for an image and "softball" for a resource may result in a moderate similarity score. Conversely, the topics of "baseball" for an image and "physics" for a resource may result in a very low similarity score.

In other implementations, a topic match score may be generated for each image topic, e.g., a separate topic match score for each topic IT1, IT2, IT3 and IT4. In still other implementations, a topic match score for the image may be generated for each resource topic, e.g., a separate topic match score for each topic RT1, RT2 and RT3. Again, a variety of scoring algorithms can be used to determine the topic match scores.

In some implementations, the topic match score is also determined by taking into account a measure of the prominence of the image within the resource. The image/resource topic scorer 112 determines one or more image prominence scores that collectively measure a prominence of a display of the image in the resource 104. The prominence of the image considers characteristics of the image (e.g., the image's size, location, pixel count, etc.) within the resource 104.

For example, an image 106a that is a small thumbnail image displayed in the side of the display area of the resource will be given a lower prominence score than an image 106b that is larger and located near the center of the resource. Often times, thumbnail images are not representative of the topic of the resource 104, while an image that is located at the center of a resource is generally representative of topic of the resource 104.

In some implementations, the one or more topic match scores determined for an image are based on measures of relevance of the image topics to the resource topics and the one or more image prominence scores. A topic match score can incorporate the prominence score by adjusting the measures of relevance of the image topics to the resource topics by the one or more prominence scores. For example, a topic match score for the image I with a prominence score P(I) may be generated by a generalized function:

$$TM(I)=f(IT1,IT2,IT3,IT4,RT1,RT2,RT3,P(I)).$$

Some resources may have different images served for each loading of the resource. For example, the first time a resource is presented at a user device, an image located at the center of the resource may depict a first animal (e.g., a panda bear). When the resource is reloaded, the text that is presented, the image located at the center of the resource may depict a second animal (e.g., a hedgehog). When this occurs, the prominence of an image is determined to be very low, even if the image is otherwise prominently displayed (e.g., within the middle of a web page). Alternatively, the system, when determining the one or more topic match scores, may load a resource multiple times to ensure that the same images load. Any location with images that differ for each reload may be determined to host dynamic images, and the relevance of any image in that location may be ignored or discounted by the system.

The one or more topic match scores, resource topics for the resource associated with the one or more topic match scores, and image topics for the image associated with the one or more top match scores are stored in the image topic match score index 120 (258). As previously described, the image topic match score index is a repository for previously determined topic match scores, image topics, and resource topics. In some implementations, the search system 116 retrieves topic match scores from the image topic match score index 120 when determining which image search results to present at a user device responsive to a search query. Further details regarding presenting image search results will be described in connections with FIGS. 3A and 3B.

Search Processing

Figure 3A:
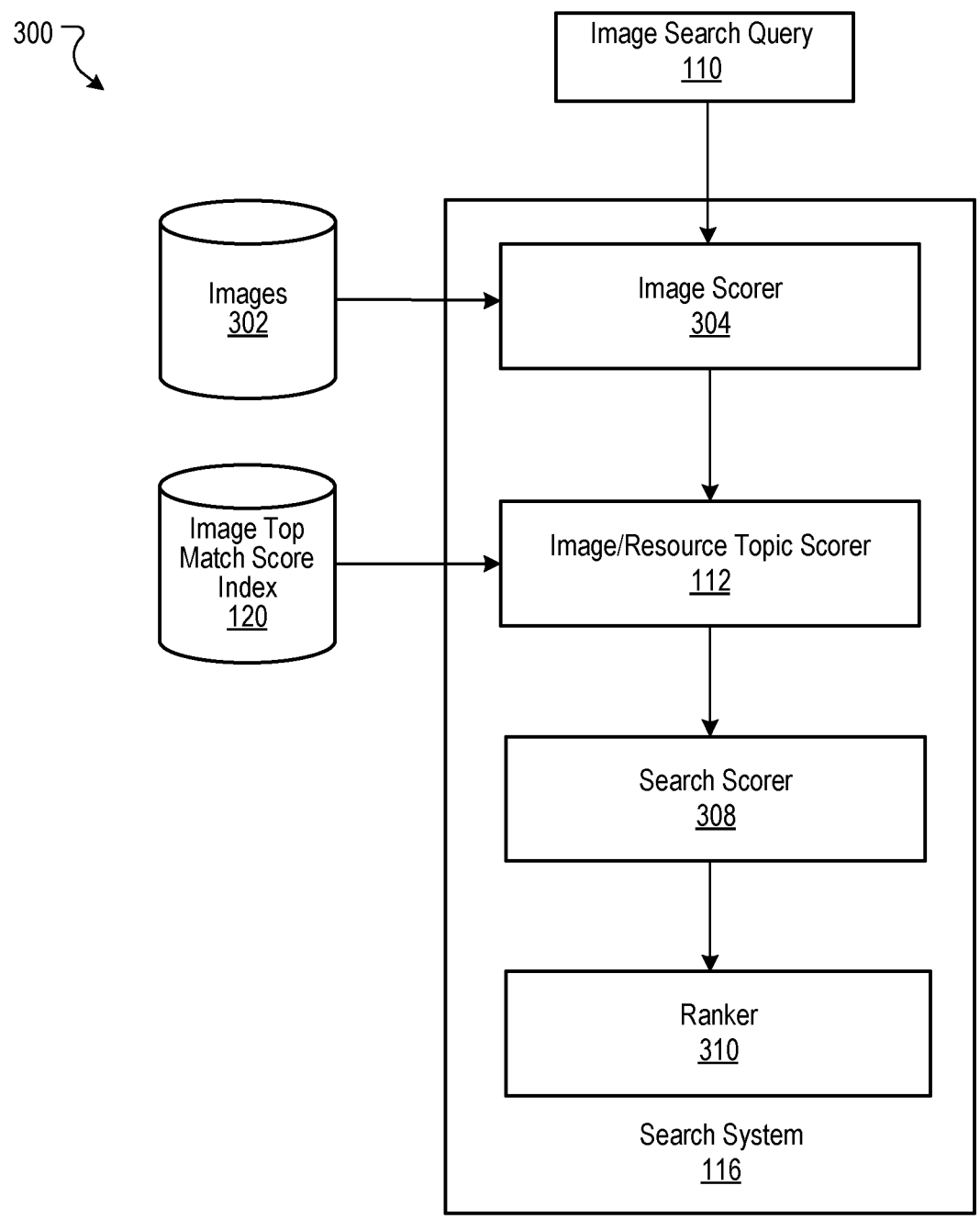
FIG. 3A is a block diagram illustrating components for ranking image search results based on image topic match scores.
Figure 3B:
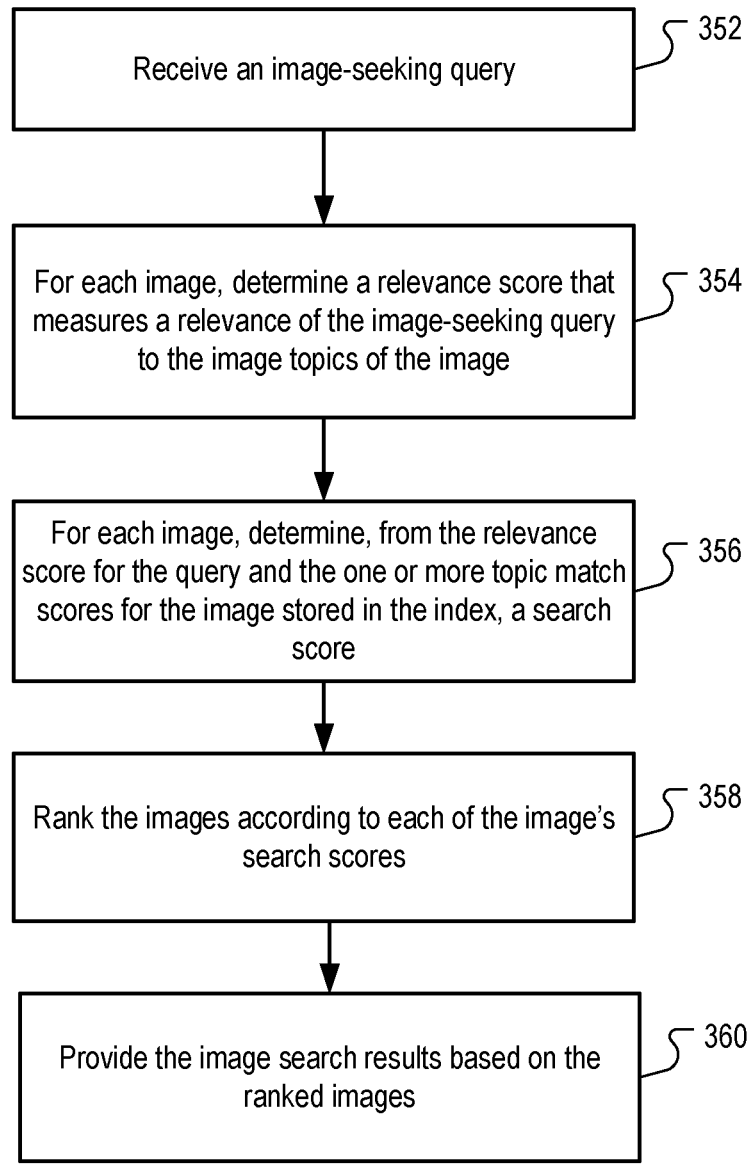
FIG. 3B is a flow chart of an example process for ranking image search results by the system in FIG. 3A Like reference numbers and designations in the various drawings indicate like elements.

Images that are presented in an image search result page responsive to an image search query are ranked based on the image's topic match score. FIG. 3A is a block diagram illustrating components 300 for ranking image search results based on image topic match scores and FIG. 3B is a flow chart of an example process for ranking image search results by the system in FIG. 3A. FIG. 3B will be discussed in connection with FIG. 3A. In some implementations, the search system includes an image scorer 304, an image/resource topic scorer 112, a search scorer 308, and a ranker 310, the operations of which are described below.

The search system 116 receives an image seeking query (352). For example, the system 116 may receive a search query from a user device.

The search system 116, for each image, determines a relevance score that measures a relevance of the image-seeking query to the image topics of the image (354). For example, the image scorer 304 uses metadata describing the topics determined for the image to determine how relevant the images are to the image search query 110.

In other implementations, the relevance score may be determined not based on the topics identified for the image but on computer vision processes that determines semantic meanings from the image and then evaluates the relevance of the query to the semantic meanings. Other appropriate ways of determining a relevance score that measures a relevance of an image to a query may also be used.

The search system 116, for each image, determines, from the relevance score determined for the query and the one or more topic match scores for the image stored in the index, a search score (356). The search score may be based on a scoring function that takes into account the topic match scores determined as described with reference to FIGS. 2A and 2B above.

Following the previous examples for images A and B, where image A is an image of the Empire State Building presented in a resource that describes the history, facts, and the current state of the Empire State Building, and image B is an image of the Empire State Building within a resource about photo editing, assume the image scorer 304 determines a relevance score of 0.95 for Image A and a relevance score of 0.97 for Image B. Based only on these scores, Image B would be ranked higher than Image A. However, the assume the image/resource topic scorer 112 determined a topic match score of 0.92 for image A and a topic match score of 0.10 for image B. Recall that the topic match scores determined by the scorer 112 measures the relevance of one or more of the image topics of the image to one or more of the resource topics of the resource. Using the relevance scores determined by the search system and the topic match scores determined by the scorer 112, the search scorer 308, based on a scoring function that takes the relevance scores and topic match scores as inputs, may determine the search score for image A to be 0.91 and the search score for image B to be 0.20. Thus, even though Image B depicts content that appears to be slightly more relevant to the image seeking query, Image B ultimately receives a lower search score than Image A because Image A is display on a page that is more topically related to the content depicted image, while Image B is displayed on a page that is less topically related to the content depicted in the image.

The search system 116 ranks the images according the respective search scores for the images (358). Following the example, the search system 116 would rank image A as 1 and image B as 2. The search system 116 provides, to a user device from which the image search query 110 was received, a set of image search results that identify a subset of the images, which are selected according to the ranking of the search system 116 (360). Ranking and presenting the images based on the search scores provides a more accurate way to fulfill the user's informational need by providing images that belong to resources with the same or similar topicality as the topics of the content in the picture.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device. Data generated at the user device, e.g., a result of the user interaction can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, comprising:
for each resource in a plurality of resources, wherein each resource includes one or more images and text that is separate from each of the one or more images, and each resource includes instructions that, when processed by one or more user devices, cause the one or more user devices to render, on a display of each of the one or more user devices, the resource, the one or more images included in the resource, and the text included in the resource:
determining, by a data processing apparatus, and from the text of the resource, resource topics described by the text of the resource;
for each image of the one or more images included in the resource:
processing, by the data processing apparatus, the image to determine a set of image topics that describe topics to which content depicted in the image belongs, wherein the determined image topics are not based on the text of the resource; and
determining, by the data processing apparatus, one or more topic match scores, wherein each topic match score is a measure of relevance of one or more of the image topics of the image to one or more of the resource topics of the resource that includes the image; and
storing in an index, by the data processing apparatus and for each image of the one or more images, data that describes the image topics for the image, resource topics for the resource, and the one or more topic match scores for the image.

2. The method of claim 1, further comprising, for each image, processing, by the data processing apparatus, the image and the resource to determine one or more image prominence scores that collectively measure a prominence of how the image is displayed in the resource.

3. The method of claim 2, wherein determining one or topic match scores comprises determining the one or more topic match scores based on measures of relevance of the image topics to the resource topics and the one or more image prominence scores.

4. The method of claim 3, wherein determining the one or more topic match scores based on measures of relevance of the image topics to the resource topics and the one or more image prominence scores comprises adjusting the measures of relevance of the image topics to the resource topics by the one or more image prominence scores.

5. The method of claim 4, wherein determining one or more prominence scores includes determining a prominence score based on an image size of the image.

6. The method of claim 4, wherein determining one or more prominence scores includes determining a prominence score based on a display position of the image within the resource as rendered on a display of the user device.

7. The method of claim 1, wherein:
processing the image to determine a set of image topics that describe topics to which content depicted in the image belongs comprises submitting the image to an image annotation system and receiving for the image a set of annotations as the image topics; and
the image annotation system determines the set of annotations based on computer image processing of the image that determines content depicted in the image, and the set of annotations are descriptive of the determined content.

8. The method of claim 1, further comprising:
receiving an image-seeking query from a user device; and
determining, for each of the images, a search score that measures a relevance of the image to the image seeking query, the determining comprising, at least in part:
determining a relevance score that measures a relevance of the image-seeking query to the image topics of the image; and
determining, from the relevance score and the one or more topic match scores for the image stored in the index, the search score.

9. The method of claim 2, further comprising:
receiving an image-seeking query from a user device; and
determining, for each of the images, a search score that measures a relevance of the image to the image seeking query, the determining comprising, at least in part:
determining a relevance score that measures a relevance of the image-seeking query to the image topics of the image; and
determining, from the relevance score, the prominence score, and the one or more topic match scores for the image stored in the index, the search score.

10. The method of claim 9, further comprising:
ranking the images according the respective search scores for the images; and
providing, to a user device from which the image-seeking query was received, a set of image search results that identify a subset of the images, the subset selected according to the ranking.

11. The method of claim 1, wherein processing the image to determine a set of image topics that describe topics to which content depicted in the image belongs is based on metadata tags associated with the image.

12. The method of claim 1, wherein determining one or more topic match scores comprises determining the one or more topic match scores based on measures of relevance of the image topics to the resource topics in combination with a size of the image and a location of the image within the resource that includes the image.

13. The method of claim 1, wherein determining one or more topic match scores comprises determining, as a topic match between the image and the resource, a similarity between the resource topics for the resource and the image topics for the image using a similarity function, wherein the image topics for the image include at least one topic different from each of the resource topics for the resource.

14. A system, comprising:
a data processing apparatus comprising one or more processors; and
software stored in non-transitory computer readable storage medium storing instructions executable by the data processing apparatus and that upon such execution cause the data processing apparatus to perform operations comprising:

for each resource in a plurality of resources, wherein each resource includes one or more images and text that is separate from each of the one or more images, and each resource includes instructions that, when processed by one or more user devices, cause the one or more user devices to render, on a display of each of the one or more user devices, the resource, the one or more images included in the resource, and the text included in the resource:
- determining, by a data processing apparatus, and from the text of the resource, resource topics described by the text of the resource;
- for each image of the one or more images included in the resource:
  - processing, by the data processing apparatus, the image to determine a set of image topics that describe topics to which content depicted in the image belongs, wherein the determined image topics are not based on the text of the resource; and
  - determining, by the data processing apparatus, one or topic match scores, wherein each topic match score is a measure of relevance of one or more of the image topics of the image to one or more of the resource topics of the resource that includes the image; and
- storing in an index, by the data processing apparatus and for each image of the one or more images, data that describes the image topics for the image, resource topics for the resource, and the one or more topic match scores for the image.

15. The system of claim 14, wherein the operations comprise, for each image, processing the image and the resource to determine one or more image prominence scores that collectively measure a prominence of how the image is displayed in the resource.

16. The system of claim 15, wherein determining one or topic match scores comprises determining the one or more topic match scores based on measures of relevance of the image topics to the resource topics and the one or more image prominence scores.

17. The system of claim 16, wherein determining the one or more topic match scores based on measures of relevance of the image topics to the resource topics and the one or more image prominence scores comprises adjusting the measures of relevance of the image topics to the resource topics by the one or more image prominence scores.

18. The system of claim 17, wherein determining one or more prominence scores includes determining a prominence score based on an image size of the image.

19. The system of claim 17, wherein determining one or more prominence scores includes determining a prominence score based on a display position of the image within the resource as rendered on a display of the user device.

20. The system of claim 14, wherein the operations comprise:
- receiving an image-seeking query from a user device; and
- determining, for each of the images, a search score that measures a relevance of the image to the image seeking query, the determining comprising, at least in part:
  - determining a relevance score that measures a relevance of the image-seeking query to the image topics of the image; and
  - determining, from the relevance score and the one or more topic match scores for the image stored in the index, the search score.

21. The system of claim 15, wherein the operations comprise:
- receiving an image-seeking query from a user device; and
- determining, for each of the images, a search score that measures a relevance of the image to the image seeking query, the determining comprising, at least in part:
  - determining a relevance score that measures a relevance of the image-seeking query to the image topics of the image; and
  - determining, from the relevance score, the prominence score, and the one or more topic match scores for the image stored in the index, the search score.

22. The system of claim 21, wherein the operations comprise:
- ranking the images according the respective search scores for the images; and
- providing, to a user device from which the image-seeking query was received, a set of image search results that identify a subset of the images, the subset selected according to the ranking.

* * * * *